United States Patent [19]

Olshausen

[11] Patent Number: 4,577,477

[45] Date of Patent: * Mar. 25, 1986

[54] ACCESSORY LOCK AND ARTICLE STORAGE DEVICE FOR BICYCLES AND THE LIKE

[76] Inventor: Michael C. Olshausen, 1816 Kalorama Rd., NW., Apt. 105, Washington, D.C. 20009

[*] Notice: The portion of the term of this patent subsequent to Sep. 4, 2001 has been disclaimed.

[21] Appl. No.: 549,415

[22] Filed: Nov. 7, 1983

Related U.S. Application Data

[63] Continuation-in-part of Ser. No. 457,459, Jan. 12, 1983, Pat. No. 4,468,939.

[51] Int. Cl.⁴ .................................................. E05B 73/00
[52] U.S. Cl. ........................................... 70/58; 70/63; 70/233
[58] Field of Search .................. 70/1, 58, 59, 61, 63, 70/233–236; 220/4 B, 4 E, 210; 224/30 R; 248/218.4, 219.3, 219.4

[56] References Cited

U.S. PATENT DOCUMENTS

| | | | |
|---|---|---|---|
| 3,766,759 | 10/1973 | Artner | 70/58 |
| 3,772,645 | 11/1973 | Odenz et al. | 70/234 X |
| 3,950,972 | 4/1976 | Bleier et al. | 70/234 |
| 3,976,273 | 8/1976 | Kussow | 248/218.4 |
| 3,981,166 | 9/1976 | Madonna | 70/234 |
| 4,189,054 | 2/1980 | Liu et al. | 220/4 B X |
| 4,248,067 | 2/1981 | Sears | 70/63 X |
| 4,284,289 | 8/1981 | Loux | 70/233 X |
| 4,325,531 | 4/1982 | Omholt | 70/63 X |
| 4,468,939 | 9/1984 | Olshausen | 70/63 X |

FOREIGN PATENT DOCUMENTS

| | | | |
|---|---|---|---|
| 29302 | of 1911 | United Kingdom | 224/30 R |
| 124227 | 3/1919 | United Kingdom | 70/233 |
| 566289 | 12/1944 | United Kingdom | 70/58 |

Primary Examiner—Robert L. Wolfe

[57] ABSTRACT

An article storage device is set forth adapted to be attached to the frame of a bicycle or the like. The device has a pair of complementary members which enclose a portion of the frame when the members are brought into engagement with each other as well as form an enclosed space for storing small articles. A lock is provided for locking the members together and to effect frictional securement of the frame relative to the members. A flange and overlapping lip is provided for preventing forced separation of said members by a pry means or the like. A collar is also provided which both maintains the device in a shielded position beneath the rear wheel stays and holds the device, when open, for easy inspection of the contents of the device.

5 Claims, 18 Drawing Figures

ACCESSORY LOCK AND ARTICLE STORAGE DEVICE FOR BICYCLES AND THE LIKE

RELATED INVENTIONS

This application is a continuation-in-part application of U.S. patent application Ser. No. 06/457,459, filed Jan. 12, 1983 now U.S. Pat. No. 4,468,939.

BACKGROUND OF THE INVENTION

This invention relates to locking devices and more specifically to a device for both removably securing an accessory such as a tire pump to a bicycle as well as providing an enclosed space for storing small articles.

PRIOR ART AND OBJECTS

Applicant is unaware of any single device capable of both securing against theft an accessory such as a tire pump to a bicycle or the like and providing a locked enclosure for storing small articles such as tire patches, tire irons, etc. Devices are known for securing just accessories such as tire pumps to bicycle frames, examples of which are disclosed in Swiss Pat. No. 222,421 (1942) and French Pat. No. 889,103 (1943); however, no provision is made for storing against theft the related articles such as tire patches, tire irons for removing the tire from the inner tube, spare brake or derailleur cables, and other necessary or valuable articles. Lock boxes for bicycles and the like are also well known; however, for practical reasons none are both sufficiently large to secure against theft an elongated accessory such as a tire pump or the like as well as other articles and yet sufficiently small to mount conveniently on a bicycle.

It is therefore the primary object of the present invention to provide a single, novel device attachable to the frame of a bicycle or the like for securing against theft an accessory such as a tire pump as well as other small articles.

It is another object of the invention to provide a device of the subject nature which, due to its unique construction, can be easily attached to or removed from a frame member of a bicycle or the like by a person without mechanical skill, which is water resistant, and which can be simply unlocked for removal of the secured accessory or stored article.

It is yet another object of the invention to provide a device which is relatively inexpensive to make yet is light in weight, rugged, and very theft resistant.

Other objects and advantages of the present invention will become apparent and obvious from a study of the following description and accompanying drawings, which are merely illustrative of the present invention.

DESCRIPTION OF PREFERRED EMBODIMENTS

Figure 1:
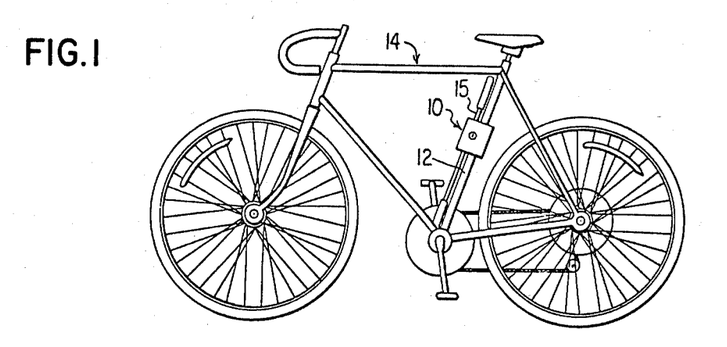
FIG. 1 is a pictorial view of a bicycle showing the accessory lock and article storage device of the present invention mounted thereon.
Figure 2:
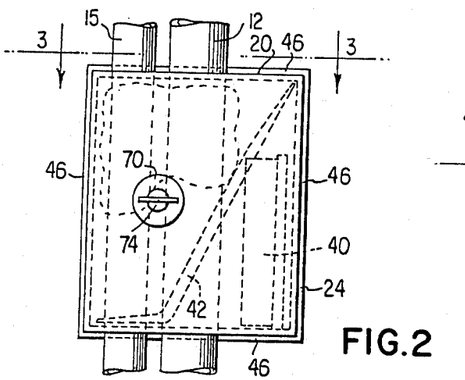
FIG. 2 is an elevational view of the side of the device on which the lock mechanism is mounted.
Figure 3:
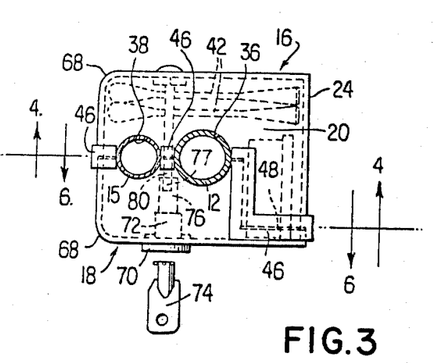
FIG. 3 is a plan view of the device taken along the lines 3—3 of FIG. 2.
Figure 4:
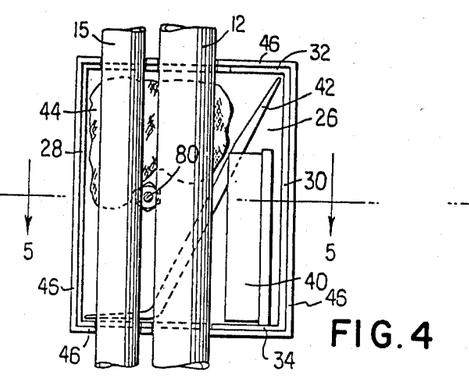
FIG. 4 is a side view of the device in partial cross-section taken along the lines 4—4 of FIG. 3.
Figure 5:
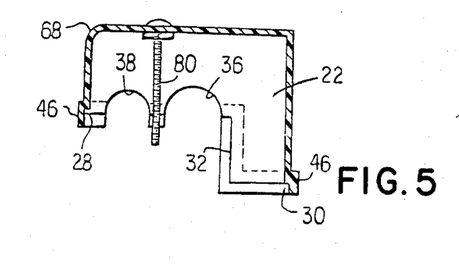
FIG. 5 is a plan view of the device in partial cross-section taken along the lines 5—5 of FIG. 4.
Figure 6:
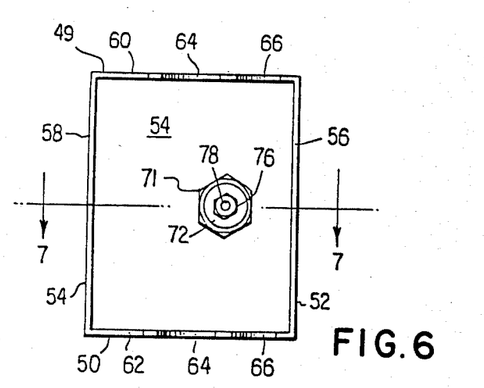
FIG. 6 is a side view of the device taken along the lines 6—6 of FIG. 3.
Figure 7:
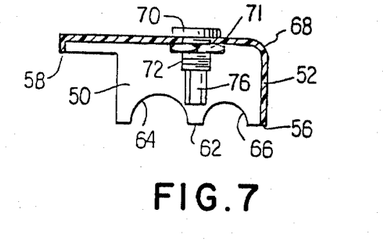
FIG. 7 is a plan view of the device taken along the lines 7—7 of FIG. 6.

Referring now to the drawings where like characters of reference indicate like elements in each of the several views, there is illustrated generally at 10 in FIG. 1 the accessory lock and article storage device of the present invention mounted to a frame member 12 of a bicycle 14 and securing a tire pump 15.

The device, as can be seen by referring to FIGS. 2-7, has a first member 16 and a second member 18 which when assembled form a generally box-shape structure. The first member 16 has parallel spaced-apart top and bottom walls 20,22, respectively, which are joined by means of a side wall 24 to form an enclosed area 26 with an open end. The open end is defined by the edges 28,30 of side wall 24 and edges 32,34 of top and bottom walls 20,22, respectively. The edges 32 and 34 each have a scalloped or semi-circular portion 36 which are in registry with each other and which have a depth slightly less in length than the radius of the frame member 12. Similarly, the edges 32 and 34 also have a scalloped or semi-circular portion 38 which are in registry with each other and which have a depth slightly less in length than the radius of the mid-section of the tire pump 15 or similar article to be locked by the device. The function of the particular shape of scalloped portions 36,38 will be more fully discussed later.

The configuration of top of wall 20 and more specifically bottom wall 22 is substantially L-shaped which provides maximum surface area for holding small articles to be stored such as a box of tire patches 40, tire irons 42, and a cleanup rag 44, for example, and prevents them from falling out when the second member 18 is removed. A flange element 46 is also provided which is preferably integrally formed with the top, bottom and side walls 20,22,24, respectively, and extends a distance past the edges 28, 30 and edges 32,34 with the exception of scalloped portions 36,38. The flange element 46 performs the functions of enabling the second member 18 to be quickly and accurately aligned with the first member 16 as well as to cover the slight gap 48 between the members thereby preventing to a substantial degree water and dirt from entering the device. The flange 46 also helps prevent the members 16, 18 from being twisted or pried open.

The second member 18 has a top wall 49 and a bottom wall 50 which are joined by a side wall 52 to form an enclosed are 54 with an open end. The open end is defined by edges 56,58 of side wall 52 and edges 60,62 of top and bottom walls 49,50, respectively. The edges 60,62 each have a scalloped or semi-circular portion 64 which is in registry and in shape similar to portion 36. Similarly the edges 60,62 each have a scalloped or semi-circular portion 66 which is in registry and in shape similar to portion 38. The shape of the top and bottom walls 49,50 is complementary to the L-shape of top and bottom walls 20,22, such that when they are joined together a substantially rectangular shape results. The edges 68 can be rounded to provide a more aerodynamic shape and a less sharp edge should they accidently be struck by the rider whose legs, however, spaced-apart by the pedals, allow ample clearance.

In order to keep the first member 16 and second member 18 together and in the desired position on the frame member 12, a locking mechanism 70 is provided. The locking mechanism 70 comprises a conventional rotary lock member 72 of the "vending machine"-type secured to side wall 52 of second member 18 by a nut 71 and operated by a key 74 of, for example, cylindrical type. A coupling 76 is secured to lock member 72 and is rotated thereby. The coupling 76 has a threaded bore 78 which is in alignment with a correspondingly threaded shaft 80, such as a carriage bolt, secured at one end to side wall 24 of first member 16 and passing between frame member 12 and tire pump 15. The length of the shaft 80 is chosen so as to engage the entrance of bore 78 as the first and second members 16,18 are brought together so that a simple twist or rotation of key 74 in the lock 72 will cause the threads of the coupling 76 to engage the corresponding threads of the shaft 80. Continued rotation of the key 74 causes the members 16,18 to draw together until the curved portions 36,64 frictionally engage the frame member 12 and curved portions 38,66 frictionally engage the tire pump 15 to secure same in their desired positions. As aforementioned, this frictional engagement results from the fact that the curved portions 36,64 and 38,66 do not form a perfect circle when joined but rather one which is slightly oblate. The depth 77 of full engagement of threaded shaft 80 by threaded bore 78 added to the width of gap 48 is slightly less than the distance flange element 46 extends beyond edges 28-34 so that flange element 46 in fact overlaps member 18 when members 16 and 18 are initially brought together, thus holding member 16 in alignment with member 18 immediately before the coupling 76 has begun to engage threaded shaft 80. After the desired degree of tightness is achieved, the key 76 is removed. Frictional engagement prevents the device from sliding down frame member 12 and pump 15 when the bicycle is in motion.

Similarly, to open the device, the first member 16 is held in one hand while the key 74 is rotated with the other. After the second member 18 is unlocked, the tire pump 15 or the stored articles can be removed.

Figure 8:
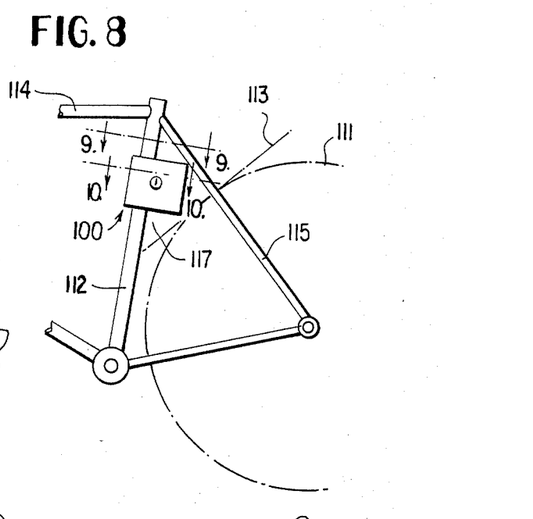
FIG. 8 is a schematic representation depicting another embodiment of the invention mounted on a bicycle frame.

Referring now to the drawings where at 100 in FIG. 8 another embodiment of the article storage device of the present invention is shown mounted to a frame member 112 of a bicycle 114. The device 100 is mounted so that it touches the top pair of rear wheel stays 115. The device 100 is large enough to nearly fill, and thereby to exploit, the space 117 formed by the frame member 112, the rear wheel stays 115 and the tangent 113 to the rear wheel 111. The length of the side walls 124 and 152 is such that the device, when mounted on frame member 112, does not come into contact with rear wheel 111.

The device, as can be seen by referring to FIGS. 8-11, has a first member 116 and a second member 118 which when assembled form a generally box-shaped structure. The first member 116 has parallel spaced-apart top and bottom walls 120,122, respectively, which are joined by means of a side wall 124 to form an enclosed area 126 with an open end. The open end is defined by the edges 128,130 of side wall 124 and edges 132,134 of top and bottom walls 120,122, respectively. The edges 132 and 134 each have a scalloped or semi-circular portion 136,137, respectively, which are in registry with each other and which have a depth slightly less in length than the radius of the outer surface 194 of bushing 182 attached to frame member 112 and the radius of the frame member 112, respectively.

The configuration of top wall 120 and more specifically bottom wall 122 is substantially L-shaped which provides maximum surface area for holding small articles 140 to be stored, such as keys to the house, a set of duplicate I.D., a bottle of presciption medication, or tampons, for example, and prevents them from falling out when the second member 118 is removed. A flange element 146 is also provided which is preferably integrally formed with the top, bottom and side walls 120,122,124, respectively, and extends a distance past the edges 128,130 and edges 132,134 with the exception of scalloped portions 136,137. The flange element 146 performs the functions of enabling the second member 118 to be quickly and accurately aligned with the first member 116 as well as to cover the slight gap 148 between the members thereby preventing water and dirt for entering the device as aforementioned. The flange 146 also helps prevent the members 116,118 from being twisted or pried open.

The first member 116 has a right-angle edge-molding member 141 along the rear top edge, where top wall 120 meets side wall 124. Molding 141 extends the raised edge formed by flange element 146, as the flange wraps around top wall 120 and side wall 124, across the width of first member 116. This permits first member 116 of the device to slide smoothly against the wheel stays 115 and then up onto the bushing lip 192, as can best be seen in FIGS. 9 and 11.

The second member 118 has a top wall 149 and a bottom wall 150 which are joined by a side wall 152 to form an enclosed area 154 with an open end. The open end is defined by edges 156,158 of side wall 152 and edges 160,162 of top and bottom walls 149,150, respectively. The edges 160,162 each have a scalloped or semi-circular portion 164,165, respectively, which is in registry and in shape similar to portion 136,137, respectively. The shape of the top and bottom walls 149,150 is complementary to the L-shape of top and bottom walls 120,122 such that when they are joined together a substantially rectangular shape results. The edges 168 can be rounded for comfort in handling the device.

Figure 10:
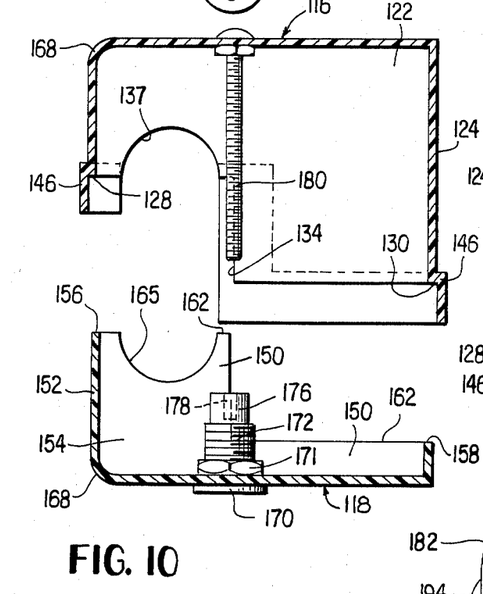
FIG. 10 is an expanded cross-sectional view taken along lines 10—10 of FIG. 8.

In order to keep the first member 116 and second member 118 together and in the desired position on the frame member 112, a locking mechanism 170 is provided. The locking mechanism 170 comprises a conventional rotary cyclinder lock member 172 secured to side wall 152 of second member 118 by a nut 171 and operated by a key 174 of, for example, flat type. A coupling 176 is secured to the lock member 172 and is rotated thereby. The coupling 176 has a threaded bore 178 which is in alignment with a correspondingly threaded shaft 180, such as a carriage bolt, secured at one end to side wall 124 of first member 116 and passing very closely adjacent to frame member 112. The close proximity of shaft 180 to frame member 112 minimizes torque about frame member 112 when the first member 116 and the second member 118 of the device are drawn together by the engagement of the threaded shaft 180 with the threaded bore 178 during rotation of the coupling 176 by key 174. The length of the shaft 180 is chosen so as to engage the entrance of bore 178 as the first and second members 116,118 are brought together so that a simple twist or rotation of the key 174 in the lock 172 will cause the threads of the coupling 176 to engage the corresponding threads of the shaft 180 in the same method as in the first embodiment. Continued rotation of the key 174 causes the members 116,118 to draw together until the curved portions 137,165 frictionally engage the frame member 112 and curved portions 136,165 engage the bushing 182 attached to frame member 112 to secure the device in its desired position; namely, with molding 141 in contact with wheel stays 115. This frictional engagement results from the fact that the curved portions 136,164, as well as 137,165, do not form a perfect circle when joined but rather one which is slightly oblate. As the lock 172 is tightened, binding of the second member 118 against the first member 116 of the device is minimized by placing that portion of edges 132 and 134 which is parallel to the threaded shaft 180 directly over the center-line of the threaded shaft 180, as shown in FIG. 10. That is, binding is minimized by providing two lines of substantial length relative to the dimensions of the device along which the first and second members 116,118 of the device can slide as they are drawn together, which lines are furthermore in registry and in the same plane as the line of force, the force being one of compression supplied by the engagement of thread shaft 180 by coupling 176. The depth 177 of full engagement of threaded shaft 180 by threaded bore 178 added to the width of gap 148 is slightly less than the distance flange element 146 extends beyond edges 128-134 so that flange element 146 in fact overlaps member 118 when members 116 and 118 are initially brought together, thus holding member 116 in alignment with member 118 immediately before the coupling 176 has begun to engage threaded shaft 180. After the desired degree of tightness is achieved, the key 174 is removed. Frictional engagement prevents the device from sliding down frame member 112 when the bicycle is in motion. Such frictional engagement can be enhanced by having raised stipples or serrations on the curved portions 136,164,137,165 or a cusped or beveled surface formed thereon (not shown).

Similarly, to open the device, the first member 116 is held in one hand while the key 174 is rotated with the other. After the second member 118 is unlocked, the stored articles can be removed.

Figure 12:
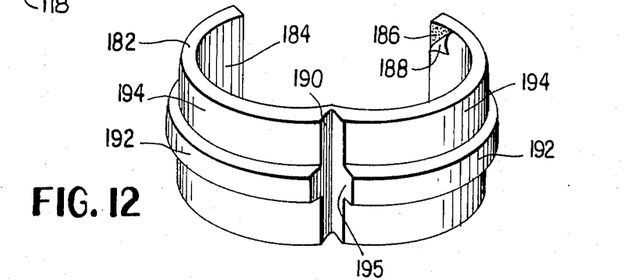
FIG. 12 is a perspective view of the pinch bushing of the present invention.

A split bushing or support member 182 is provided for attachment to frame member 112. Initially open in order to encompass said frame member, said bushing 182 has a notched area 190 which permits the sides of said bushing to be pinched together until the inner surface 184 of said bushing is in contact with said frame member, to which inner surface 184 is then congruent. Inner surface 184 has a contact adhesive 186 thereon which is exposed by peeling back a covering 188. Once applied to frame member 112, bushing member 182 is virtually immobile, due to the shear strength of the contact adhesive, with respect to movement along the length of the said frame member.

Figure 9:
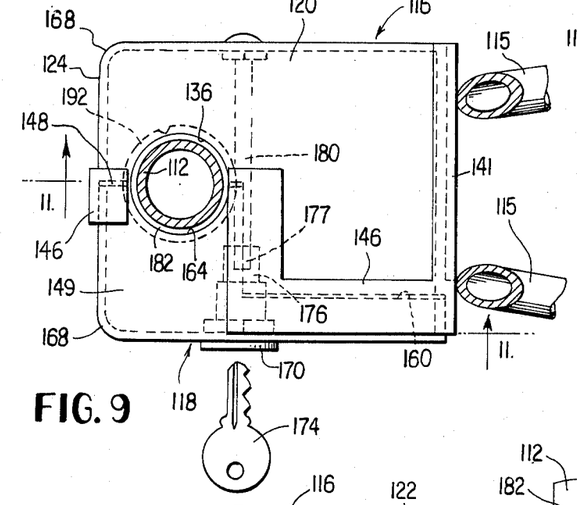
FIG. 9 is a plan view of the device taken along the lines 9—9 of FIG. 8.
Figure 11:
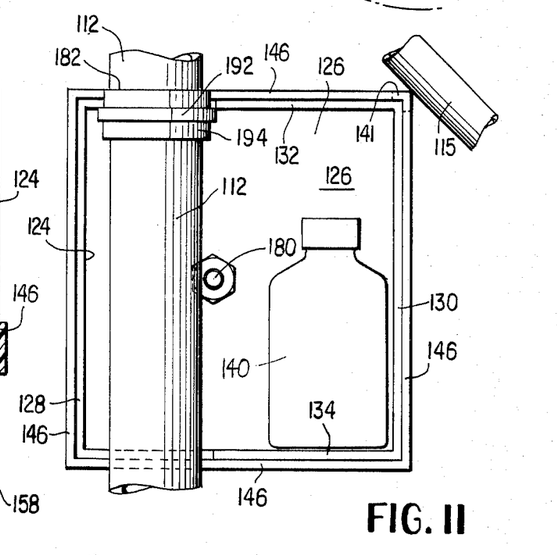
FIG. 11 is a side elevational view taken along lines 11—11 of FIG. 9.

Outer curved surface 194 of bushing member 182 is congruent to scalloped or semi-circular portions 136,164 of top walls 120,149 of the device once the bushing has been applied to the frame member 112. The compression of the bushing effected by the drawing together of members 116,118 of the device enhances the longitudinal immobility of the bushing as applied to the frame member. A lip 192 with square cross-section 195 extends radially outward from the outer surface 194 of the bushing along the bushing's equator. With first member 116 of the device positioned so that wheel stays 115 are brought into contact with edge-molding 141, or into contact with edge-molding 141 and flange element 146, as shown in FIGS. 8, 9, and 11, the radial lip 192 with square cross-section 195 acts to hold first member 116 in contact with wheel stays 115, thus preventing both the rotation of first member 116 about frame member 112 as well as the sliding of first member 116 down frame member 112, thereby eliminating the need to hold member 116 while inspecting its contents. When the device is shut and locked, lip 192 in concert with the frictional engagement of the device itself about frame member 112 prevents the device from being forced out of contact with the wheel stays 115, thereby preventing rotation of the device 100 and thus enhancing the device's security by maintaining it in a shielded position beneath the wheel stays 115. Because the sole object of this embodiment of the device is to store securely items not including a bicycle pump, the shielding provided by position 117 against prying and hacksawing is particularly advantageous.

Figure 13:
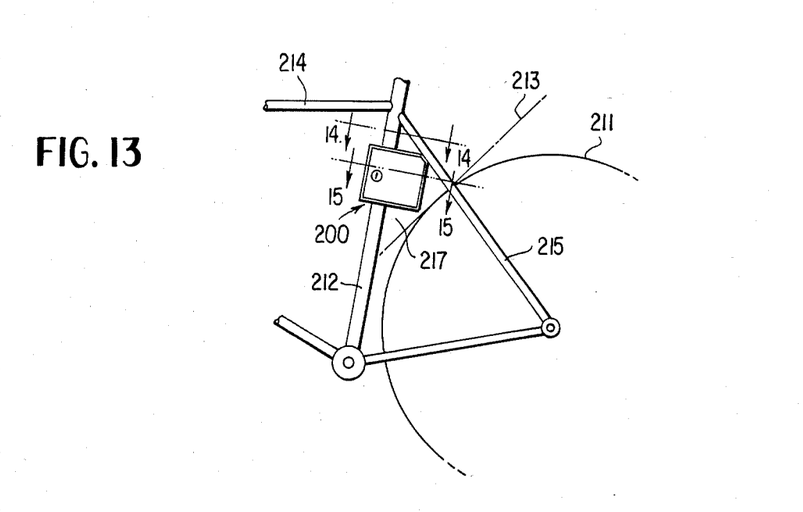
FIG. 13 is a schematic representation depicting another embodiment of the invention mounted on a bicycle frame.

Referring now to the drawings where at 200 in FIG. 13 another embodiment of the article storage device of the present invention is shown mounted to frame member 212 of a bicycle 214. The device 200 is mounted so that it touches the top pair of rear wheel stays 215. The device 200 is large enough to nearly fill, and thereby to exploit, the space 217 formed by the frame member 212, the rear wheel stays 215, and the tangent 213 to the rear wheel 211. The length of side walls 224 and 252 is such that the device, when mounted, does not come into contact with the rear wheel 211.

The device 200, as can be seen by referring to FIGS. 13-17, has a first member 216 and a second member 218 which when assembled form a generally box-shaped structure. The first member 216 has parallel spaced-apart top and bottom walls 220,222, respectively, which are joined by means of a side wall 224 to form an enclosed area 226 with an open end. The open end is defined by the edges 228,230 of side wall 224 and edges 232,234 of top and bottom walls 220 and 222, respectively. The edges 232 and 234 each have a scalloped or semi-circular portion 236 which are in registry with each other.

The configuration of the top wall 220 and more specifically bottom wall 222 is substantially L-shaped, which provides maximum surface area for holding small articles such as a watch, keys to the house, and a billfold, for example, at the beach, and prevents them from falling out when the second member 218 is removed.

The second member 218 has a top wall 249 and a bottom wall 250 which are joined by a side wall 252 to form an enclosed area 254 with an open end. The open end is defined by edges 256,258 of side wall 252 and edges 260,262 of top and bottom walls 249,250, respectively. Edges 260,262, though in themselves rectangular, depart from perpendicularity and parallelism with respect to the rectangular side wall 252 of the second member 218 of the device by a rotation through an angle $\theta$ about the axis defined by the interior corner of edge 256 of side wall 252, when it comes into contact with the interior corner of edge 228 of side wall 224, interior being understood to refer to the space enclosed by the device, i.e., the space formed by joining 254 and 226. The edges 260,262 each have a scalloped or semi-circular portion 264 which are in registry and which in extent are less than a full semi-circle by the amount removed by the rotation through the angle $\theta$ of edges 260,262 with respect to side wall 252, as can best be seen in FIG. 15. Edge 268 of side walls 252 and 224 can be rounded for comfort in handling the device.

The shape of the top and bottom walls 249,250 is complementary to the L-shape of the top and bottom walls 220,222 such that when they are joined together a substantially rectangular shape results. A flange element 246 partially surrounding member 218 is also provided which is preferably integrally formed with the top, bottom, and side walls 249,250,252, respectively, and extends a distance past the edges 256,260, and 262 with the exception of scalloped portions 264 and with the exception of edge 258, where side wall 252 itself becomes an element of the flange. The flange element 246 performs the functions of enabling the second member 218 to be quickly and accurately aligned with the first member 216 as well as to cover the slight angular gap 248 between the members, thereby preventing water and dirt from entering the device. The overlapping of member 216 by the flange 246 and rear edge 258 of member 218 helps prevent the members from being twisted or pried open.

An anti-pry element 300 partially surrounding member 216 is provided which is preferably integrally formed with top, bottom, and side walls 220,222, and 224, respectively, and which, when the members 216 and 218 of the device are brought together into engagement with one another, overlaps flange element 246 and side wall 252 at the point where side wall 252 forms the continuation of flange element 246 about member 218. Anti-pry lip 300 performs the functions of shielding the edge of flange element 246 from a prying tool such as a screwdriver, and, more importantly, of preventing the application of a more specialized tool, which might resemble a large bottle-cap remover, simultaneously to rear edge 258 of side wall 252 and to the side face of side wall 252 for the purpose of attempting to force open the device by bending back the metal side wall to expose the contents of the device. Those portions of anti-pry lip 300 which are located on the front and rear of member 216 are slightly beveled (not shown) to accommodate the rotation through an angle $\theta$ of second member 218 of the device.

The first member 216 has an edge molding 241 beveled at the angle formed by the rear wheel stays 215 and frame member 212 and such that the face of edge molding 241, which is placed in contact with rear wheel stays 215 contains the line formed by the intersection of top wall 220 and side wall 224, thus allowing the dimensions of the device to be chosen exclusively to maximize the internal volume. Any edge molding protruding beyond the box-like structure of the device encroaches on the space available in the area 217. A facet 243 is provided in anti-pry lip 300 which continues the bevel of edge molding 241 across nearly the full width of member 216, thereby allowing member 216 to slide smoothly against the wheel stays 215 and onto the circular flange 292 of collar 282, as can best be seen in FIG. 16. Facet 244 is provided across top wall 220 and side wall 224 of first member 216; facet 245 is provided across flange element 246 and side wall 252 of second member 218. Facets 244 and 245 are beveled (not shown) to accommodate a slight rotation through an angle $\theta$ of second member 218 of the device.

In order to keep the first member 216 and second member 218 together and in the desired position on the frame member 212, a locking mechanism 270 is provided. The locking mechanism 270 comprises a conventional rotary cylinder lock member 272 secured to side wall 252 of second member 218 by a nut 271 and operated by a key 274 of, for example, flat type. A coupling 276 is secured to the lock member 272 and is rotated thereby. The coupling 276 has a threaded bore 278 which is in alignment with a correspondingly threaded shaft 280, such as a carriage bolt, secured at one end to side wall 224 of first member 216 and passing very closely adjacent to frame member 212. The close proximity of shaft 280 to frame member 212 maximizes the torque about the interior point of contact of edges 228 of first member 216 and 256 of second member 218 when the member 216,218 are drawn together by the engagement of the threaded shaft 280 with the threaded bore 278 during the rotation of the coupling 276 by key 274. That is, the interior point of contact of the edges 228,256 becomes the fulcrum for a third class lever in which the force is supplied by the rotational engagement of the coupling 276 and the shaft 280 and the resistance by the frame member 212. The length of the shaft 280 is chosen so as to engage the entrance of bore 278 as the first and second members 216,218 are brought together so that a single twist or rotation of the key in the lock 272 will cause the threads of the coupling 276 to engage the corresponding threads of the shaft 280 in the same method as in the first and second embodiments. Continued rotation of the key 274 urges the members 216,218 into a slight rotation about the interior point of contact of edges 228,256 of the device until the curved portions 236,264 frictionally engage the frame member 212 to secure the device in its desired position; namely, with the molding 241 in contact with wheel stays 215. This frictional engagement results from the fact that the curved portions 264 of member 218 are each not a complete semi-circle but are instead formed by a secant intersecting a semi-circle. The depth 277 of full engagement of threaded shaft is slightly less than the distance flange element 246 and rear edge 258 of side wall 252 extend beyond edges 256–262 so that flange element 246 and rear edge 258 in fact overlap member 216 when members 216 and 218 are initially brought together, thus holding member 216 in alignment with member 218 immediately before the coupling 276 has begun to engage threaded shaft 280. After the desired degree of tightness is achieved, the key 274 is removed. Frictional engagement prevents the device from sliding down frame member 212 when the bicycle is in motion. The standard looseness of standard threading permits the threaded bore 278 and the threaded shaft 280 to tighten at a slight angle $\theta$ with respect to each other.

Similarly, to open the device, the first member 216 is held in one hand while the key 274 is rotated with the other. After the second member 218 is unlocked, the stored articles can be removed.

Figure 18:
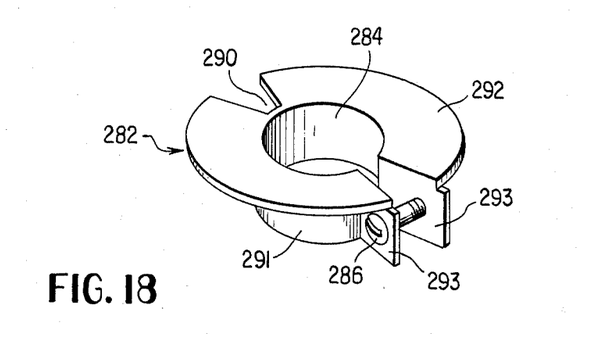
FIG. 18 is a perspective view of the collar of the present invention.

A split collar or support member 282 is provided for attachment to frame member 212. The split collar 282 comprises a flat circular flange 292 attached to a split cylinder 291 which, at the ends where the cylinder is split, has two tabs 293 set at right angles to the cylinder and bored to permit a bolt 286 to pass through the tabs, which bolt is provided with a nut 288 so that the tabs 293 may be drawn together to tighten the collar 282 about the frame member 212. That is, the inner surface 284 of collar 282 is brought into frictional engagement with frame member 212, to which it is then congruent. Provided with notched area 290 in the flange 292, the collar may be spread open in order to embrace the frame member 212. Once tightened about frame member 212, the collar 282 is virtually immobile, due to friction, with respect to movement along the length of the said frame member.

Figure 14:
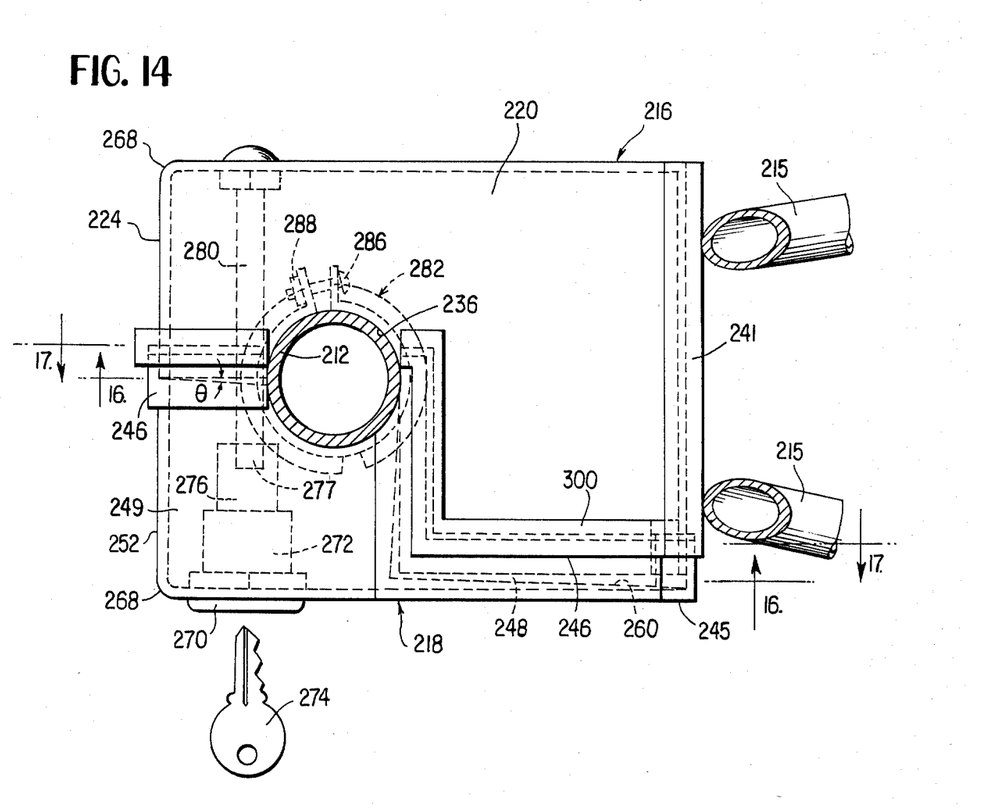
FIG. 14 is a plan view in partial cross-section of the device taken along the lines 14—14 of FIG. 13.
Figure 15:
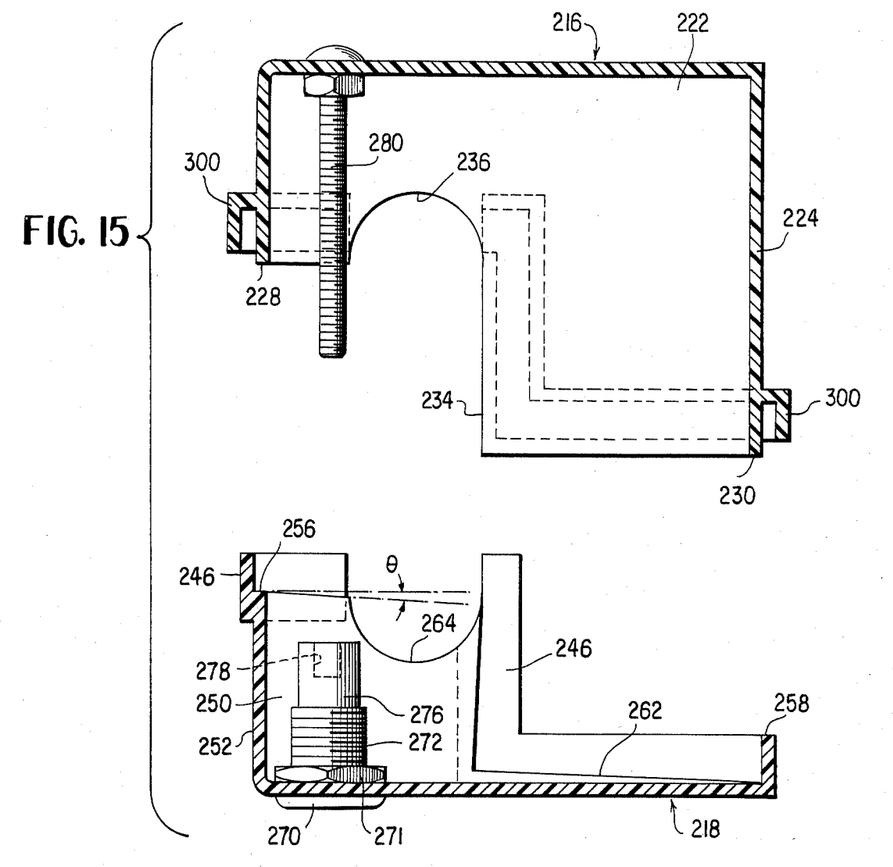
FIG. 15 is an expanded cross-sectional view taken along lines 15—15 of FIG. 13.
Figure 16:
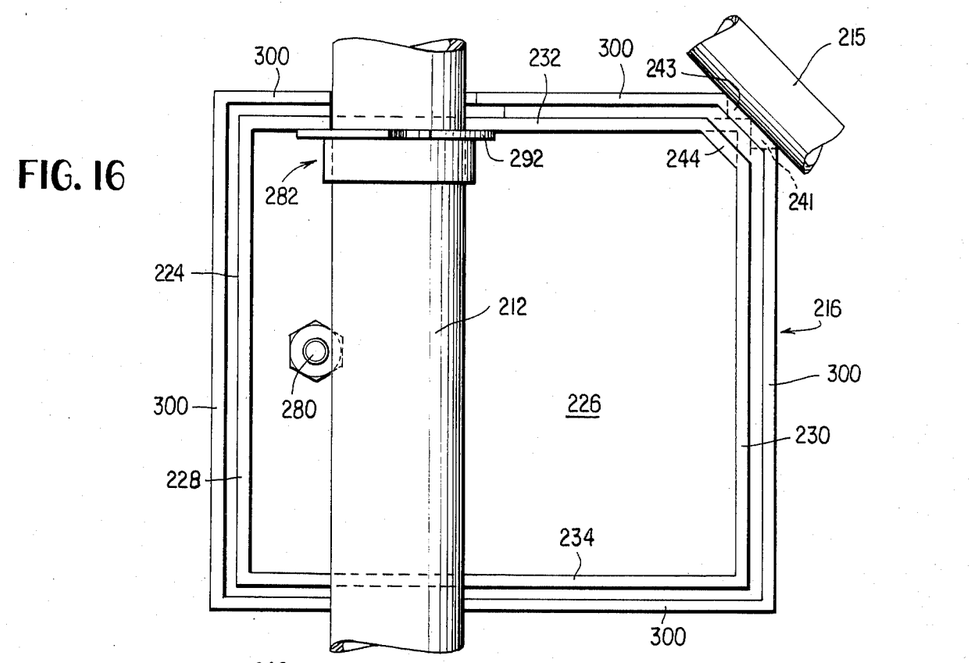
FIG. 16 is a side elevational view taken along lines 16—16 of FIG. 14.
Figure 17:
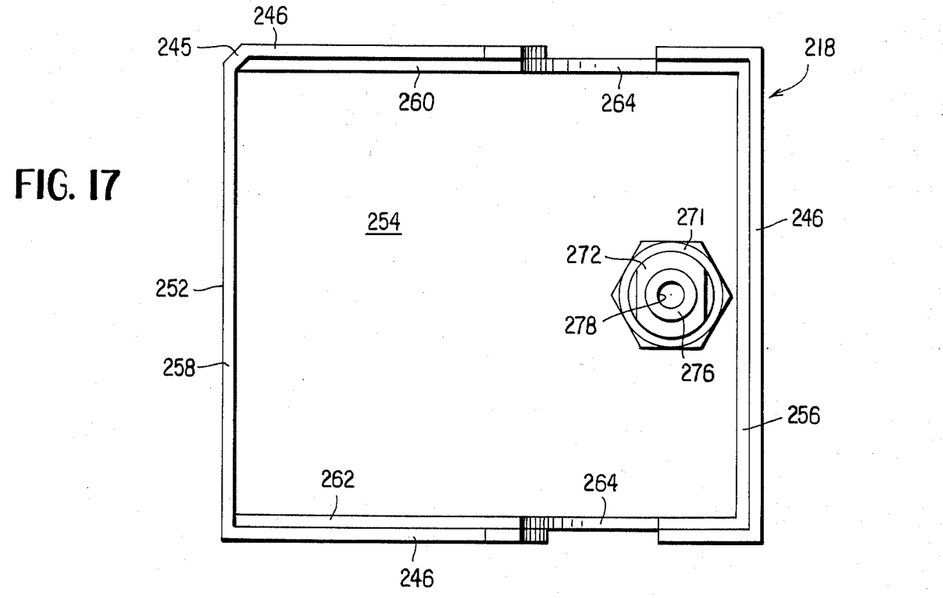
FIG. 17 is a side view of the device taken along lines 17—17 of FIG. 14.

With first member 216 of the device held against frame member 212 such that molding 241 is in contact with wheel stays 215, collar 282 is positioned such that circular flange 292 is in contact with the interior surface of top wall 220. Subsequently, when the members 216, 218 are drawn together in the locked position, the combined frictional engagement of both the collar 282 and the device 200 about frame member 212 strongly inhibits forced movement of the device 200 down the frame member 212.

With first member 216 of the device positioned so that wheel stays 215 are brought into contact with edge-molding 241, the flat circular flange 292 acts to hold first member 216 in contact with wheel stays 215, thus preventing both the rotation of first member 216 about frame member 212 as well as the sliding of first member 216 down frame member 212, thereby eliminating the need to hold member 216 while inspecting its contents. When the device is shut and locked, flange 292 helps prevent the device from being forced out of contact with the wheel stays 215, thereby preventing rotation of the device 200 and thus enhancing the device's security by maintaining it in a shielded position.

These and many different embodiments of this invention may be made without departing from the scope and spirit thereof. Therefore, it is to be understood that the invention is not limited to the specific embodiment shown and described herein, except as defined in the appended claims.

I claim:

1. An article storage device adapted to be attached to a frame of a bicycle or the like comprising:
   (a) first and second members adapted to frictionally engage said frame member, said first and second members each having a side wall connected to spaced-apart top and bottom walls and together forming an enclosed storage space when brought into engagement with said frame member, said top and bottom walls each have an indented portion shaped to surround a portion of said frame, said shape of said indented portion of at least one of said members being less than a full semi-circle to enable said frictional engagement with said frame member to be varied when said first and second members are drawn together into contact with said frame member,
   (b) support means adapted to be positioned on said frame to prevent said first member individually or said first and second members when in engagement with each other from sliding on said frame, said support means having a cylindrical-shaped body portion with a radially extending flange adapted to engage and support said top wall of said first member, and
   (c) means for locking said first and second members together to effect securement of said device to said frame member.

2. A device as set forth in claim 1 wherein said support means has adhesive means on the inside surface thereof to secure said support means to said frame.

3. A device as set forth in claim 1 wherein said support means has means for drawing said cylindrical-shaped body portion of said support means into frictional engagement with said frame.

4. An article storage device adapted to be attached to a frame of a bicycle or the like comprising:
   (a) first and second members adapted to frictionally engage said frame member, said first and second members each having a side wall connected to spaced-apart top and bottom walls and together forming an enclosed storage space when brought into engagement with said frame member, said top and bottom walls each have an indented portion shaped to surround a portion of said frame, said shape of said indented portion of at least one of said members being less than a full semi-circle to enable said frictional engagement with said frame member to be varied when said first and second members are drawn together into contact with said frame member,
   (b) means for locking said first and second members together to effect securement of said device to said frame member,
   (c) a flange element secured to said second member around at least a portion thereof which overlaps a corresponding portion of said first member when said first and second members are brought into engagement with each other to facilitate alignment of said second member with respect to said first member, and
   (d) a lip element secured to said first member which overlaps a portion of said flange element on said second member to prevent forced separation of said first and second members when secured together by said locking means.

5. An article storage device adapted to be attached to a frame of a bicycle, said frame having a pair of rear wheel stays, said device comprising:
   (a) first and second members adapted to frictionally engage said frame member, said first and second members each having a side wall connected to spaced-apart top and bottom walls and together forming an enclosed storage space when brought into engagement with said frame member, said top and bottom walls each have an indented portion shaped to surround a portion of said frame, said shape of said indented portion of at least one of said members of said device being less than a full semi-circle to enable said frictional engagement with said frame member to be varied when said first and second members are drawn together into contact with said frame member, (b) means for locking said first and second members together to effect securement of said device to said frame member, and (c) molding means formed on said first member, said molding means projecting a distance above the geometrical plane of said top wall and projecting a distance above the geometrical plane of an adjacent portion of said side wall of said first member, said molding means being adapted to engage said rear wheel stays to prevent said device from being rotated on said frame.

* * * * *